(12) United States Patent
Kalpathi et al.

(10) Patent No.: US 6,242,874 B1
(45) Date of Patent: Jun. 5, 2001

(54) PHASE COMMUTATION OF A SWITCHED RELUCTANCE MOTOR BY SINGLE PHASE SENSING OF INDUCTANCE

(75) Inventors: Ramani R. Kalpathi, Ann Arbor, MI (US); Peter T. Szymanski, Toledo, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/427,597

(22) Filed: Oct. 27, 1999

(51) Int. Cl.$^7$ ........................................................... H02P 7/06
(52) U.S. Cl. .............................................. 318/254; 318/434
(58) Field of Search ........................................ 318/254, 701, 318/139, 434

(56) References Cited

U.S. PATENT DOCUMENTS

| | | | |
|---|---|---|---|
| 4,450,396 | 5/1984 | Thornton | 318/721 |
| 4,520,302 | 5/1985 | Hill et al. | 318/696 |
| 4,531,079 | 7/1985 | Muller | 318/254 |
| 5,015,927 | 5/1991 | Reichard | 318/139 |
| 5,525,887 | 6/1996 | Van Sistine | 318/701 |
| 5,530,333 * | 6/1996 | Turner | 318/701 |
| 5,552,685 * | 9/1996 | Young et al. | 318/254 |
| 5,569,990 * | 10/1996 | Dunfield | 318/254 |
| 5,589,751 * | 12/1996 | Lim | 318/701 |
| 5,689,167 | 11/1997 | Vitunic | 318/767 |
| 5,786,681 * | 7/1998 | Kalpathi | 318/701 |
| 5,844,385 | 12/1998 | Jones et al. | 318/254 |
| 5,859,518 | 1/1999 | Vitunic | 318/701 |
| 5,912,542 * | 6/1999 | Zalesski | 318/701 |
| 6,011,368 * | 1/2000 | Kalpathi et al. | 318/434 |
| 6,060,858 * | 5/2000 | Blackburn et al. | 318/701 |

\* cited by examiner

*Primary Examiner*—Khanh Dang
*Assistant Examiner*—Rina I. Duda
(74) *Attorney, Agent, or Firm*—Dykema Gossett PLLC

(57) ABSTRACT

A method for controlling a motor and a circuit for implementing the method are provided. The method includes the steps of providing a first current to a first phase coil of a motor and determining a characteristic of the first current in the first phase coil wherein the characteristic is indicative of the position of the motor's rotor. The measured characteristic may comprise a time period required for the current to move between two predetermined current levels. The method further includes the step of controlling the first current in the first phase coil of the motor and a second current in a second phase coil of the motor responsive to the measured characteristic in the first phase coil. By controlling the current in multiple phase coils responsive to a current characteristic measured in one phase coil, current sensing in all but one phase coil may be eliminated thereby conserving microprocessor resources, increasing motor efficiency, speed, and braking torque, and reducing acoustic noise.

20 Claims, 7 Drawing Sheets

PHASE COMMUTATION OF A SWITCHED RELUCTANCE MOTOR BY SINGLE PHASE SENSING OF INDUCTANCE

BACKGROUND OF THE INVENTION

1. Field of the Invention

This invention relates to switched reluctance motor controls, and, more particularly, to a method and a circuit for controlling multiple phases of a switched reluctance motor by sensing a characteristic of a current in a single phase of the motor.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" or conduction interval of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

In order to maintain a relatively constant torque on the rotor—and to thereby optimize motor efficiency—it is important to maintain an "in-phase" relationship between the position of the rotor and the active stage or conduction interval of each motor phase. In other words, it is important that the conduction interval be initiated, controlled, and commutated as the rotor reaches predetermined rotational positions. If the conduction interval is initiated and/or commutated too early or too late with respect to the position of the rotor (i.e., the conduction interval "leads" or "lags" the rotor), a constant torque on the rotor will not be maintained and the motor will not operate at an optimum efficiency.

Conventional switched reluctance motors have attempted to maintain an "in-phase" relationship between the conduction intervals of the motor phases and the position of the rotor by continuously sensing rotor position and adjusting the control signals that initiate and commutate the conduction intervals in response thereto. Conventional motors have employed a variety of "direct" and "indirect" methods and means for sensing rotor position. Conventional direct sensing means have included Hall-effect sensors and optical sensors mounted directly on the rotor or disposed proximate thereto. These direct sensors are disadvantageous because they consume a large amount of space, are relatively expensive and are unreliable.

Conventional indirect sensing methods and circuits have included measurements of phase coil currents or flux that are indicative of rotor position. Indirect sensing methods and circuits are generally less expensive and more reliable than direct sensing methods and circuits. Conventional motor control methods and circuits, however, use indirect sensing to measure current or flux characteristics in each motor phase of the motor—resulting in several disadvantages. First, measurement of current or flux characteristics in each motor phase of the motor consumes a relatively large amount of microprocessor resources. Second, indirect sensing of rotor position is generally accomplished by generating a sensing current pulse during a period of falling inductance in each motor phase—thereby introducing a braking torque on the rotor. Measurement of current or flux characteristics in each motor phase, therefore, further reduces the efficiency and maximum speed of the motor. Further, because braking is accomplished by initiating conduction intervals during the period of falling inductance, the use of current sensing pulses in each motor phase during the same period reduces the maximum duration of the conduction intervals, thereby reducing available braking torque. Finally, because each sensing current pulse contributes to an increase in acoustic noise, the use of current sensing pulses in each motor phase results in an undesirable level of acoustic noise.

There is thus a need for a method and a circuit for controlling a switched reluctance motor that will minimize or eliminate one or more of the above-mentioned deficiencies.

SUMMARY OF THE INVENTION

The present invention provides a method and a circuit for controlling a motor such as a switched reluctance motor.

A method for controlling a motor in accordance with the present invention includes the step of providing a first current to a first phase coil of the motor. A method in accordance with the present invention also includes the step of determining a characteristic of the first current in the first phase coil. The characteristic is indicative of a position of a rotor of the motor. The characteristic may, for example, comprise a time period for the first current in the first phase coil to move between first and second predetermined current levels. A method in accordance with the present invention may finally include the step of controlling the first current in the first phase coil of the motor and a second current in a second phase coil of the motor responsive to the determined characteristic.

A circuit in accordance with the present invention includes means for providing a first current to a first phase coil of the motor. The providing means may include switches disposed on either side of the phase coil and a microcontroller or discrete circuits that generate control signals for selectively closing the switches and coupling the phase coil to a power source. A circuit in accordance with the present invention may also include means for determining a characteristic of the first current in the first phase coil wherein the characteristic is indicative of a position of a rotor of the motor. As discussed above, the characteristic may comprise the time period for the first current to move between first and second predetermined current levels. The determining means may include a pair of comparators that compare a measured current level in the first phase coil to the first and second predetermined current levels, respectively, and generate first and second comparison signals, respectively, responsive thereto. The determining means may further include a logic gate that generates a characteristic indicative signal responsive to the first and second comparison signals. A circuit in accordance with the present invention may finally include a microcontroller operating under the control of computer programming instructions (i.e., software) or discrete circuits that control the first current in the first phase coil of the motor and a second current in a second phase coil of the motor responsive to the determined characteristic.

A method and circuit in accordance with the present invention represent a significant improvement over conventional motor control methods and circuits. In particular, the inventive method and circuit may be used to control currents in multiple phase coils by determining a current characteristic of one phase coil. The inventive method and circuit thus offers several advantages over conventional motor control methods and circuits. First, the inventive method and circuit require fewer microprocessor resources than conventional motor control methods and circuits. Second, by reducing the number of current sensing pulses, the inventive method and circuit result in increased motor efficiency. During normal running, the efficiency and maximum speed of the motor are increased because the number of current sensing pulses during the falling inductance regions of the motor phases are reduced. During braking, a greater braking torque may be generated because the conduction intervals in the respective phase coils can be made longer in the absence of multiple current sensing pulses. Finally, the inventive method and circuit generate less acoustic noise as compared to conventional circuits and methods because of the reduction in current sensing pulses.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
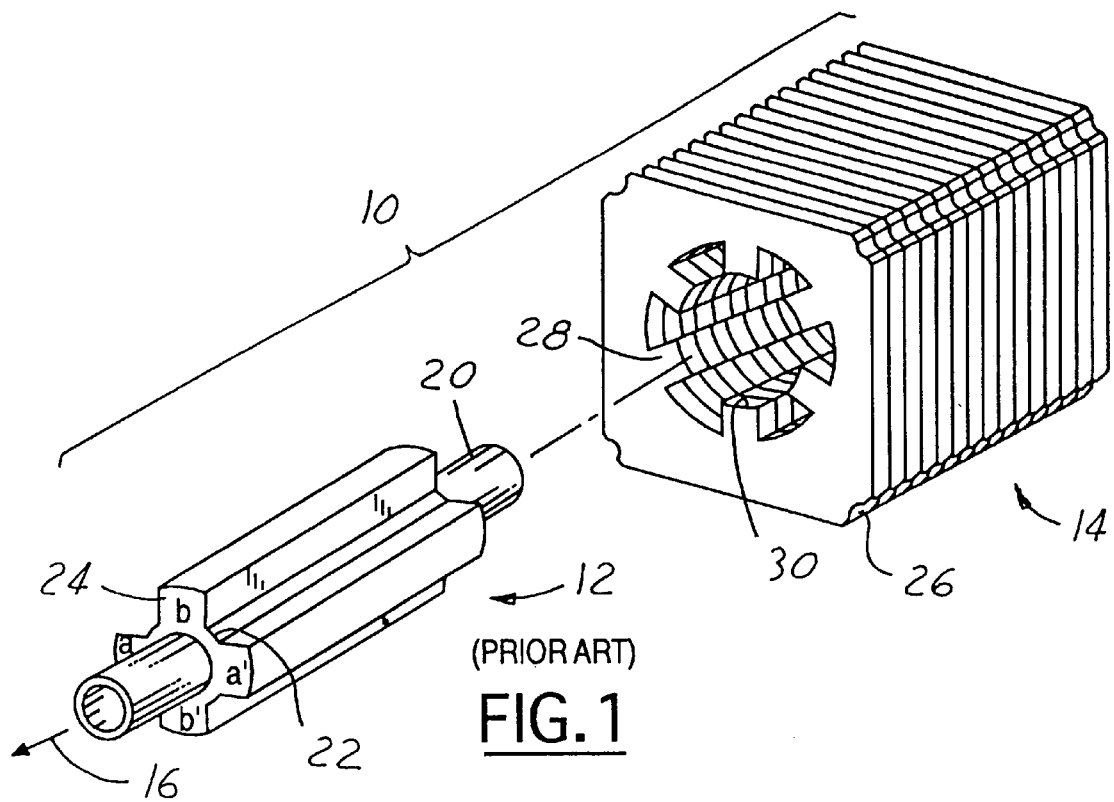
FIG. 1 is an exploded perspective view of a conventional switched reluctance motor.
Figure 2:
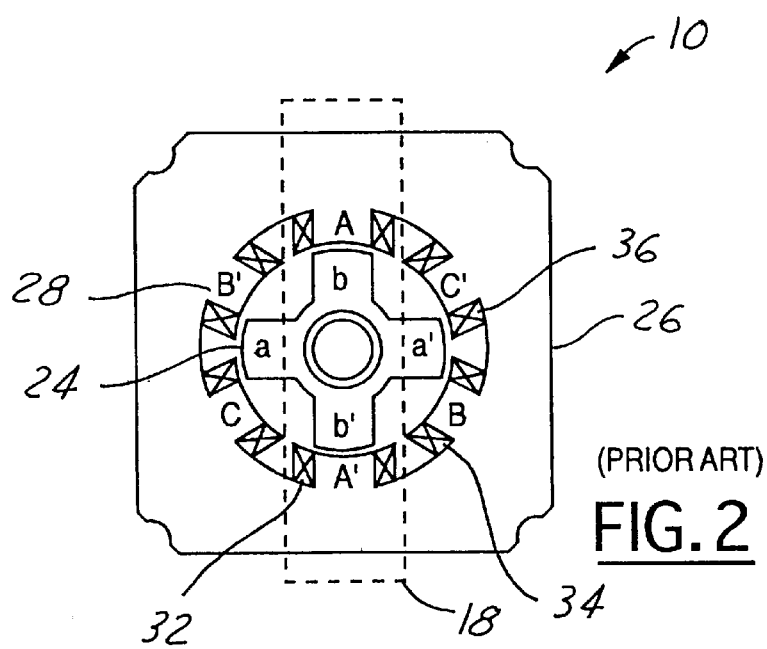
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may comprise a plurality of laminations made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided to produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C–C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction intervals in phase coils 32, 34, 36, respectively, surrounding each stator pole pair. Phase coils 32, 34, 36 are formed by connecting, in series or in parallel, windings on diametrically opposed stator poles 28. As one of phase coils 32, 34, 36 begins to conduct current, the nearest rotor pole pair is magnetically attracted towards the stator pole pair around which the energized phase coil is wound. By initiating and commutating conduction intervals in phase coils surrounding consecutive stator pole pairs, a relatively constant torque can be produced.

Figure 3:
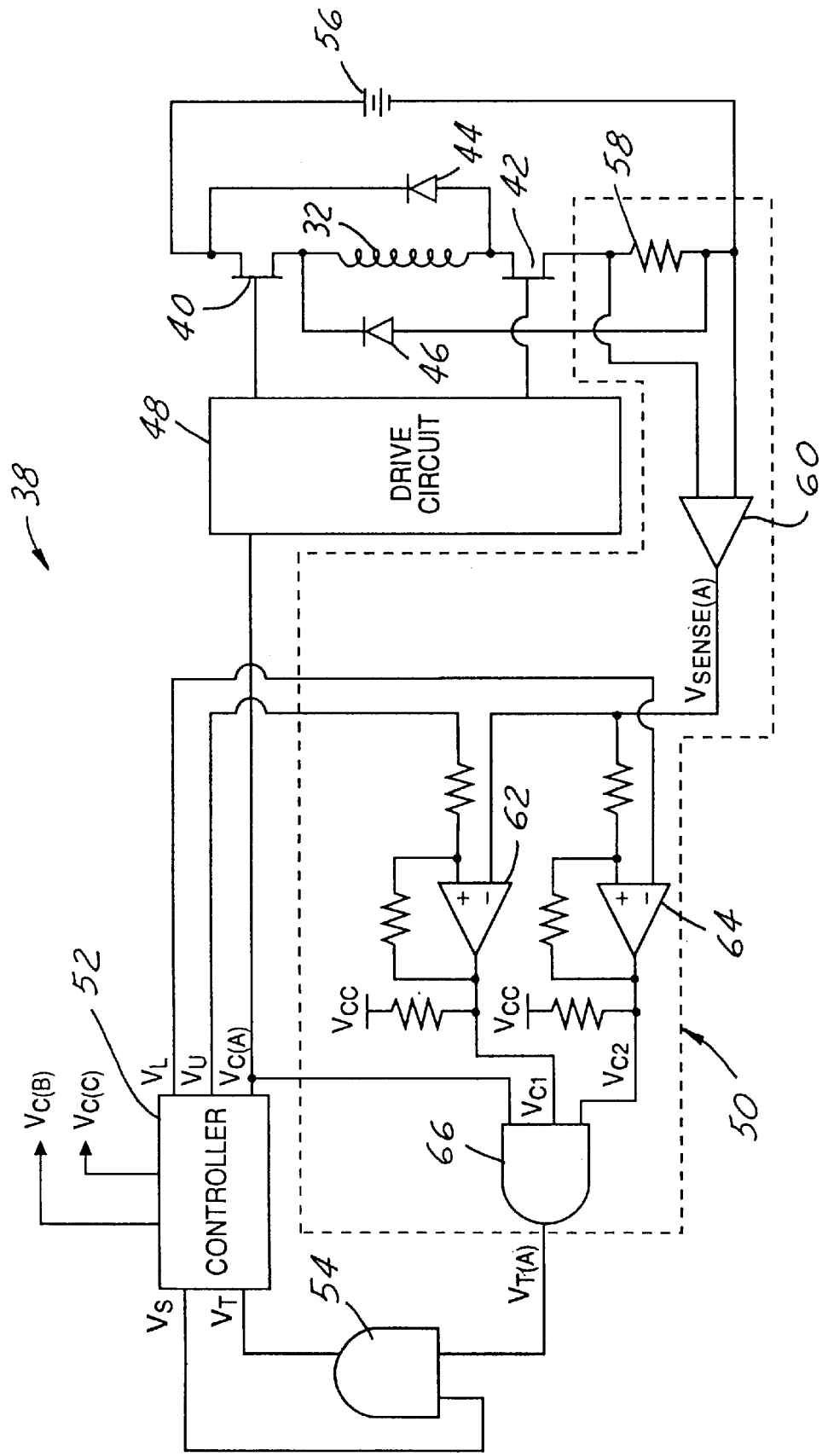
FIG. 3 is a combination schematic and block diagram illustrating a circuit for controlling a motor in accordance with the present invention.

Referring to FIG. 3, a circuit 38 for controlling motor 10 in accordance with the present invention is illustrated. Circuit 38 may include means, such as switches 40, 42, for providing current to phase coil 32, diodes 44, 46, and a drive circuit 48. Circuit 38 may also include means, such as characteristic indicative signal generating circuit 50, for determining a characteristic of a current in phase coil 32. Circuit 38 may also includes means, such as microcontroller 52 operating under the control of computer programming instructions (i.e., software), for controlling currents in phase coils 32, 34, and 36 responsive to the determined current characteristic. Circuit 38 may also include a logic circuit 54. Although only one motor phase 18 of motor 10 is illustrated in FIG. 3, it will be appreciated by those of ordinary skill in the art that circuit 38 includes additional motor phases 18 including components equivalent to switches 40, 42, diodes 44, 46, and drive circuit 48 for directing current flow within coils 34, 36 of motor 10 responsive to control signals generated by microcontroller 52.

Switches 40, 42 are provided to selectively couple a power supply 56 to phase coil 32 to energize and deenergize coil 32.

Switches 40, 42 are conventional in the art and may take any of a plurality of forms well known in the art. For example, switches 40, 42 may comprise MOSFETs. Switch 40 may be connected to a first end of coil 32 in series with coil 32. Switch 42 may be connected to a second end of coil 32, also in series with coil 32.

Diodes 44, 46 are provided to control the dissipation of current from coil 32 and, in particular, to return the current in coil 32 to power supply 56. Diodes 44, 46 are conventional in the art. Diode 44 may be connected in parallel with the series combination of switch 40 and coil 32. Diode 46 may be connected in parallel with the series combination of switch 42 and coil 32.

Drive circuit 48 is provided to adjust the voltage level of a phase control signal $V_{C(A)}$ in a conventional manner to account for different tolerances and requirements among the components of circuit 38. Drive circuit 48 may also be provided to control the current within coil 32 between predetermined upper and lower current levels during a conduction interval in coil 32.

Characteristic indicative signal generating circuit 50 is provided to generate a signal $V_{T(A)}$ indicative of a characteristic of the current in phase coil 32. Circuit 38 may includes a current sensor, such as a sensing resistor 58, an amplifier 60, comparators 62, 64 and a logic circuit 66. In the illustrated embodiment, circuit 50 is configured to generate a characteristic indicative signal $V_{T(A)}$ that is indicative of a period of time for the current in phase coil 32 to move between predetermined upper and lower current levels. In particular, signal $V_{T(A)}$ is indicative of the period of time required for the current in phase coil 32 to rise between predetermined lower and upper current levels.

Figure 4A:
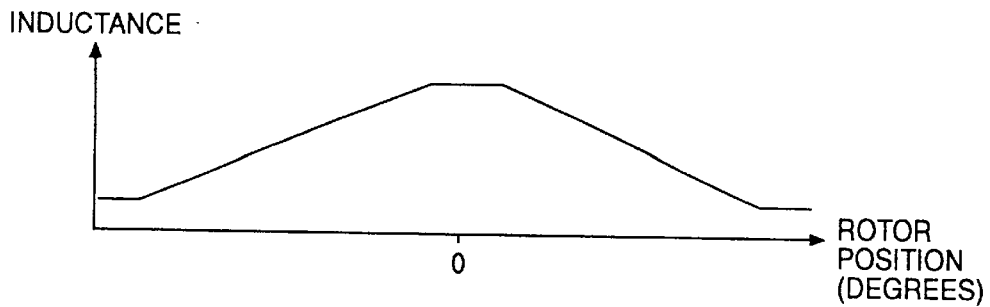
FIGS. 4A–B are timing diagrams illustrating the relationship between current rise time, inductance and rotor position.
Figure 4B:
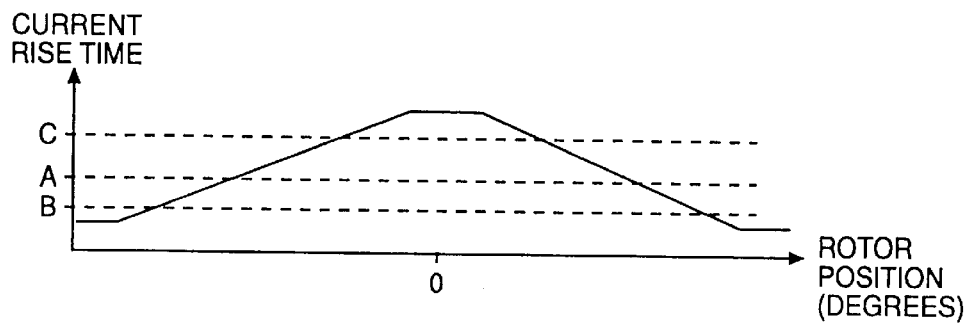

Referring now to FIGS. 4A–B, the relationship between current rise time and rotor position will be described. As is known in the art, phase inductance can be used to estimate rotor position. As shown in FIG. 4A, the level of inductance in any motor phase 18 increases linearly as a pair of rotor poles 24 approach a corresponding pair of stator poles 28. Inductance reaches a maximum when the rotor poles 24 and stator poles 28 are aligned and then decreases linearly as the rotor poles 24 move past the stator poles 28. As shown in FIG. 4B, a similar relationship exists between rotor position and the time required for a current to rise between two predetermined levels in a phase coil of motor 10. As a pair of rotor poles 24 approach a corresponding pair of stator poles 28, the time period required for the current to rise between the two predetermined levels increases linearly. When the rotor poles are aligned with the stator poles, a maximum amount of time is required for the current to rise between the two predetermined current levels. As the rotor poles move past the stator poles, the time required decreases linearly.

As shown in FIGS. 4A–B, the time required for current in a motor phase coil to rise between two predetermined levels is directly proportional to the inductance of the phase coil. As a result, measuring the time period for current to move between two predetermined levels provides an estimate of rotor position. The measured time period can then be compared to a desired time period that is indicative of a desired "in-phase" relationship between the conduction interval of the motor phase and rotor position. If the measured time period differs from the desired time period, the conduction interval is lagging or leading the rotor. For example, the point designated A in FIG. 4B may represent a desired current time period for establishing an "in-phase" relationship between the conduction interval of a motor phase 18 and rotor position at a particular operating speed. The points designated B and C may represent measured time periods for current in a phase coil of motor phase 18. As illustrated in FIG. 4B, points A, B, and C may fall on either the positive or negative slope of the current profile. As is known in the art, the conduction intervals for the motor phases 18 of a motor 10 operating at a relatively low speed generally begin and end on the positive slope of induction. Therefore, at low speeds, the desired time period and the measured time period will fall on the positive slope of the current profile. A current time period, such as time period B, that is less than the desired time period A will indicate that the current is moving between the two predetermined levels more quickly than desired and will therefore indicate that the conduction interval is leading rotor position. A time period, such as time period C, that is greater than the desired time period A will indicate that the current is moving between the two predetermined levels more slowly than desired and will therefore indicate that the conduction interval is lagging rotor position. As is known in the art, the start of the conduction interval must be advanced as the speed of the motor increases. This is accomplished by initiating the conduction interval earlier—on the negative slope of inductance. As a result, the desired and measured time periods will be found on the negative slope of the current profile as shown in FIG. 4B. Therefore, once the motor reaches a predetermined speed, the current time period B will be indicative of the conduction interval lagging rotor position while the current time period C will be indicative of the conduction interval leading rotor position.

Although circuit 50 is configured to generate a signal that is indicative of current rise time within phase coil 32, it should be understood that circuit 50 could alternatively be configured to generate a signal indicative of other current characteristics indicative of rotor position and which may be used to control currents in phase coils 32, 34, and 36. For example, circuit 50 could be configured to measure the time required for current in phase coil 32 to fall between predetermined upper and lower current levels.

Referring again to FIG. 3, the components of circuit 50 will be described in greater detail. Sensing resistor 58 is provided to generate a signal indicative of the level of current in coil 32 and is conventional in the art. Resistor 58 may have one terminal connected to switch 42 and a second terminal connected to ground. It will be understood by those in the art that a variety of conventional current sensors could be employed, including, for example, Hall effect current sensors.

Amplifier 60 is provided to convert the signal generated by sensing resistor 58 into current indicative signal $V_{SENSE(A)}$. Amplifier 60 is conventional in the art.

Comparators 62, 64 are provided to compare current indicative signal $V_{SENSE(A)}$ to upper and lower current level signals $V_U$ and $V_L$, respectively generated by microcontroller 52. Comparators 62, 64 are conventional in the art. The positive input of comparator 62 is responsive to upper current level signal $V_U$ generated by microcontroller 52 while the negative input of comparator 62 is responsive to current indicative signal $V_{SENSE(A)}$ generated by amplifier 60. Comparator 62 outputs a comparison signal $V_{C1}$ indicative of whether the level of current in coil 32—represented by current indicative signal $V_{SENSE(A)}$—is less than or greater than a predetermined upper current level—represented by upper current level signal $V_U$. The positive input of comparator 64 is responsive to current indicative signal $V_{SENSE(A)}$ generated by amplifier 60 while the negative input of comparator 64 is responsive to lower current level signal $V_L$ generated by microcontroller 52. Comparator 64 outputs a comparison signal $V_{C2}$ indicative of whether the level of current in coil 32—represented by current indicative signal $V_{SENSE(A)}$—is less than or greater than a predetermined lower current level—represented by lower current level signal $V_L$.

Logic circuit 66 is provided to generate a characteristic indicative signal $V_{T(A)}$ indicative of the time required for the current in coil 32 to move between predetermined upper and lower current levels $V_U$ and $V_L$. As set forth hereinabove, in the illustrated embodiment characteristic indicative signal $V_{T(A)}$ is indicative of a time period for the current in phase coil 32 to rise between predetermined lower and upper current levels. Logic circuit 66 is conventional in the art and may comprise an AND gate. It should be understood, however, that other gate configurations could be implemented without departing from the spirit of the present invention. Circuit 66 is responsive to phase control signal $V_{C(A)}$ and comparison signals $V_{C1}$ and $V_{C2}$.

Microcontroller 52 is provided to control currents within each motor phase 18 of motor 10 through phase control signals $V_{C(A)}$, $V_{C(B)}$, and $V_{C(C)}$. In particular, and in accordance with the present invention, microcontroller 52 is provided to control a sensing current generated during a sensing interval in phase coil 32 and to initiate and commutate conduction intervals in each motor phase 18 responsive to a determined characteristic of the sensing current in phase coil 32. Microcontroller 52 may also be provided to generate predetermined upper and lower current level signals $V_U$ and $V_L$, respectively, which are used by comparators 62, 64 in the manner described hereinabove. Microcontroller 52 may comprise a programmable microcontroller operated under the control of computer programming instructions (i.e., software). It will be understood by those of skill in the art, however, that the functions of microcontroller 52 may alternately be implemented using discrete circuits.

Logic circuit 54 is provided to generate a signal $V_T$ responsive to characteristic indicative signal $V_{T(A)}$ and a selection signal $V_S$ generated by microcontroller 52. As set forth hereinabove, characteristic indicative signal $V_{T(A)}$ represents a time period for the current in coil 32 to move between predetermined upper and lower current levels $V_U$ and $V_L$. The time period may be measured during a sensing interval that occurs a predetermined period of time before a conduction interval. Circuit 54 generates signal $V_T$ responsive to signal $V_{T(A)}$ and selection signal $V_S$. Selection signal $V_S$ ensures that the measured time period is provided to microcontroller 52 only during a selected interval (e.g., during the sensing interval). Circuit 54 is conventional in the art and may comprise an AND gate. Again, however, it should be understood that other gate configurations could be implemented without departing from the spirit of the present invention.

Figure 5A:
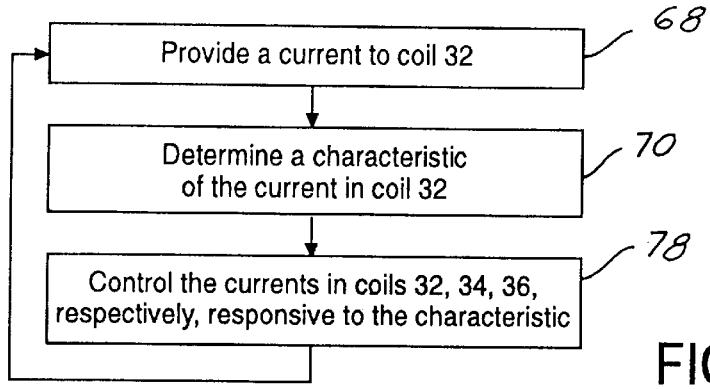
FIGS. 5A–I are flowcharts illustrating a method for controlling a motor in accordance with the present invention.
Figure 5B:
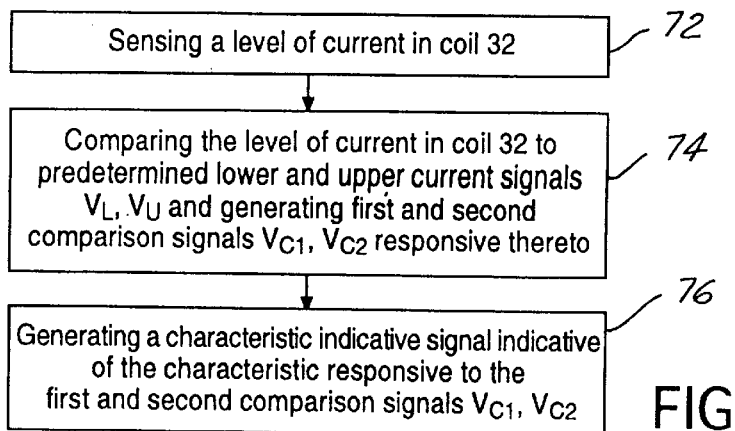

Referring now to FIGS. 5A–I, 6A–G, and 7A–F, a method for controlling motor 10 in accordance with the present invention will be described. Referring to FIG. 5A, a method for controlling a motor 10 in accordance with the present invention may include the step 68 of providing a current to coil 32 of motor 10. As set forth hereinabove, current may be provided to coil 32 through control of switches 40, 42 responsive to a phase control signal $V_{C(A)}$ generated by microcontroller 52. Referring to FIGS. 6A–B, microcontroller 52 may cause phase control signal $V_{C(A)}$ to transition to a high logic level to control switches 40, 42, and provide current to phase coil 32 during a sensing interval 69.

Referring again to FIG. 5A, a method in accordance with the present invention may further include the step 70 of determining a characteristic of the current in coil 32 wherein the characteristic is indicative of a position of rotor 22 of motor 10. Referring to FIG. 5B, step 70 may include the substep 72 of sensing a level of current in coil 32. As discussed hereinabove with reference to FIG. 3, the level of current in coil 32 may be determined using a current sensor such as sensing resistor 58 and an amplifier 60 that generates a current indicative signal $V_{SENSE(A)}$ (shown in FIG. 6B), responsive to, and indicative of, the current level sensed by resistor 58.

Figure 6A:
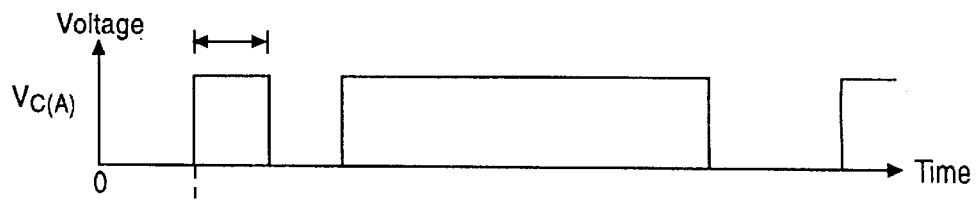
FIGS. 6A–G are timing diagrams illustrating voltage and current levels in the circuit of FIG. 3 in accordance with a method for controlling a motor in accordance with the present invention.
Figure 6B:
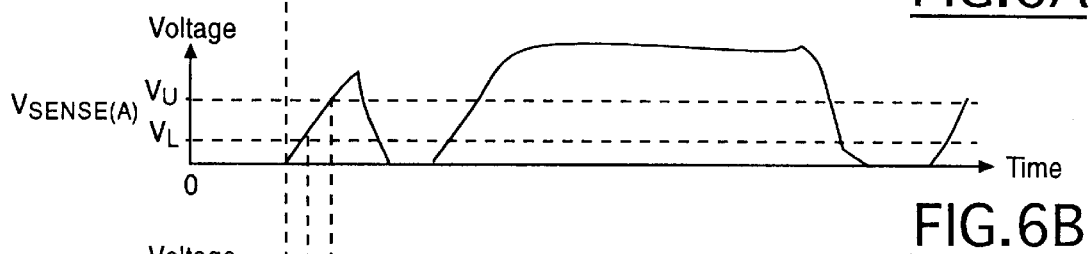
Figure 6C:
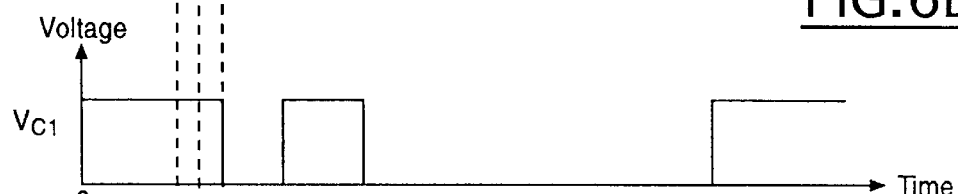
Figure 6D:
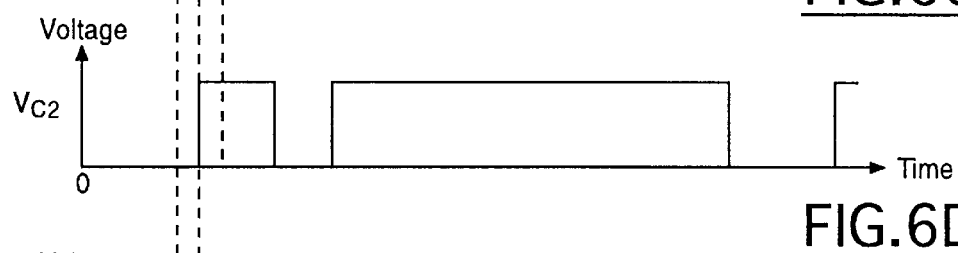

Step 70 may also include the substep 74 of comparing the level of current in coil 32 to predetermined upper and lower current levels and generating first and second comparison signals $V_{C1}$ and $V_{C2}$ responsive thereto. As discussed hereinabove with reference to FIG. 3, comparison signals $V_{C1}$ and $V_{C2}$ may be generated by comparators 62, 64, respectively. Referring to FIG. 6C, comparison signal $V_{C1}$ assumes a high logic level whenever the current level in coil 32—as indicated by $V_{SENSE(A)}$—is less than the predetermined upper current $V_U$. As shown in FIG. 6D, comparison signal $V_{C2}$ assumes a high logic level whenever the current level in coil 32—as indicated by $V_{SENSE(A)}$—is greater than predetermined lower current level $V_L$.

Figure 6E:
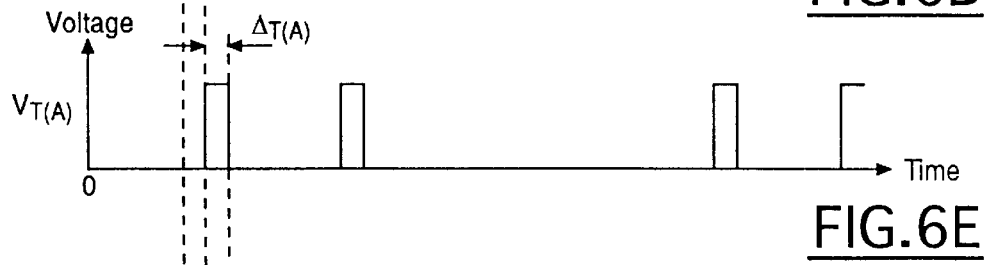
Figure 6F:
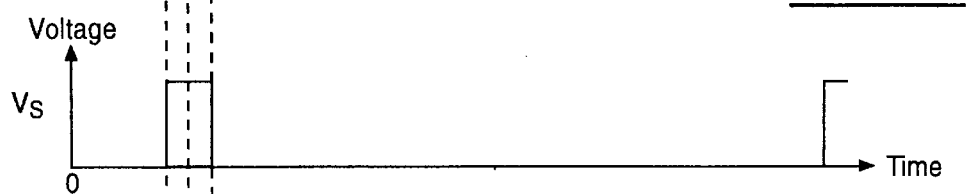
Figure 6G:
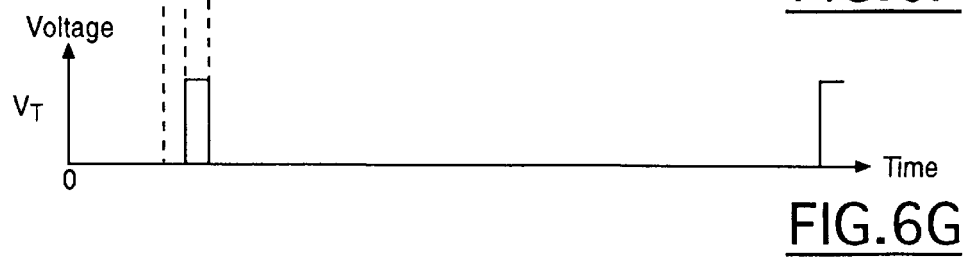

Step 70 may finally include the substep 76 of generating a characteristic indicative signal $V_{T(A)}$ indicative of the determined characteristic. As discussed hereinabove with reference to FIG. 3, logic circuit 66 may generate characteristic indicative signal $V_{T(A)}$ responsive to comparison signals $V_{C1}$ and $V_{C2}$, and phase control signal $V_{C(A)}$. Referring to FIGS. 6B and 6E, characteristic indicative signal $V_{T(A)}$ may be indicative of a time period $\Delta_{T(A)}$ required for the current in coil 32 to rise between predetermined lower and upper current levels. As set forth hereinabove with reference to FIG. 3, logic circuit 64 may then be used to ensure that the determined current characteristic is only provided to microcontroller 52 during sensing interval 69. In particular, and with reference to FIGS. 3 and 6F–G, logic circuit 64 may be configured to generate a signal $V_T$ responsive to a sensing signal $V_S$ generated by microcontroller 52 and characteristic indicative signal $V_{T(A)}$ such that the current characteristic determined by circuit 50 is only provided to microcontroller 52 during sensing interval 69.

As set forth hereinabove, in the illustrated embodiment characteristic indicative signal $V_{T(A)}$ is indicative of a time $\Delta_{T(A)}$ required for current in coil 32 to rise between predetermined lower and upper current levels. Microcontroller 52 may include a counter (not shown) triggered by the rising edge of signal $V_T$ that measures the time period $\Delta_{T(A)}$ indicated by signal $V_{T(A)}$ (and reflected in signal $V_T$). Microcontroller 52 may then utilize the falling edge of signal $V_T$ to initiate an interrupt within microcontroller 52 and read a value from the counter for use in controlling the current in phase coils 32, 34, and 36 as described in greater detail hereinbelow.

Referring again to FIG. 5A, a method in accordance with the present invention may finally include the step 78 of controlling currents in coils 32, 34, 36, respectively, responsive to the determined characteristic of the current in coil 32.

In particular, step 78 may include the substeps of controlling conduction intervals in each of phase coils 32, 34, and 36 responsive to the determined characteristic of the current in coil 32.

Figure 5C:
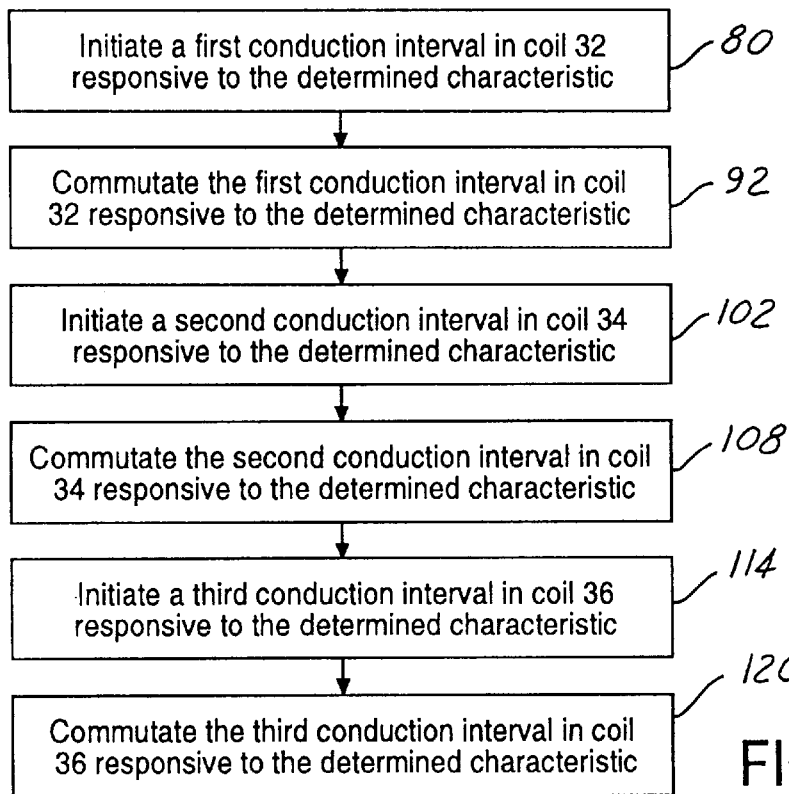
Figure 5D:
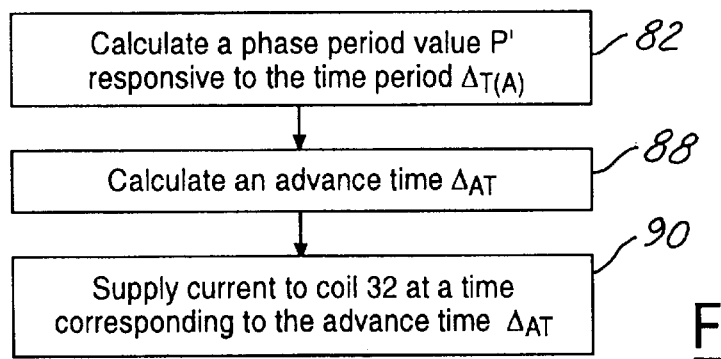
Figure 7A:
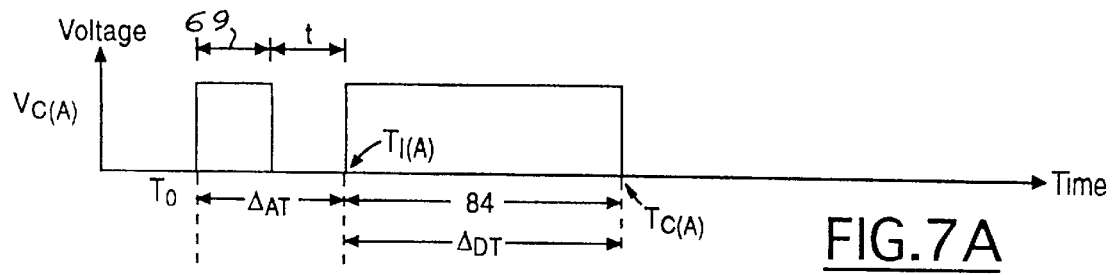
FIGS. 7A–F are timing diagrams illustrating voltage and current levels in a motor incorporating a circuit and implementing a method in accordance with the present invention.
Figure 7B:
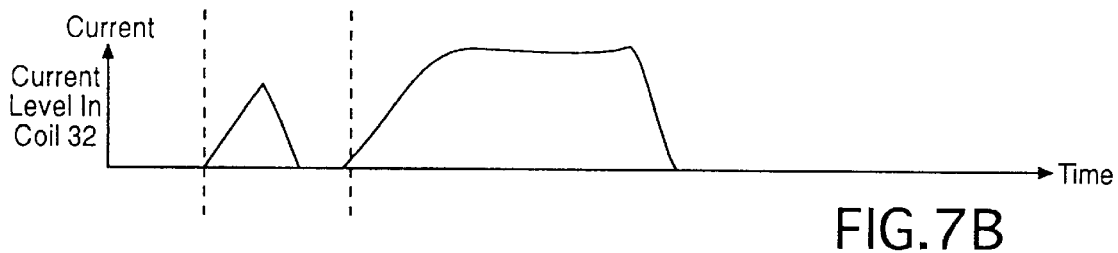
Figure 7C:
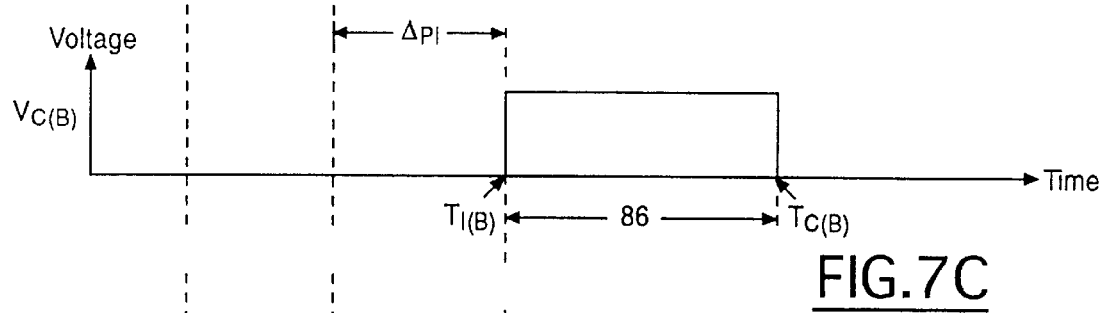

Referring to FIGS. 5C and 7A, the step of controlling a conduction interval in phase coil 32 may include the substep 80 of initiating a conduction interval 84 in coil 32 responsive to the determined characteristic. Referring to FIG. 5D, in one constructed embodiment wherein the current characteristic represents a time $\Delta T_{(A)}$ for current to rise between predetermined lower and 5 upper current levels, substep 80 may include the substep 82 of calculating a phase period value P' responsive to the determined current characteristic. The phase period value P' represents a period of time associated with one or more motor phases 18 of motor 10. Referring to FIGS. 7A and 7C, in a constructed embodiment 10 phase period value P' represents the period of time $\Delta_{PI}$ between initiation of conduction intervals in a pair of phase coils, such as conduction interval 84 in phase coil 32 and conduction interval 86 in phase coil 34. Phase period value P' may be obtained using the following formula:

$$P'=P+K(\Delta_{T(A)}\Delta_{TD})$$

wherein P represents a previously determined phase period value, K represents a gain selected to stabilize motor 10 and maintain its operation during transient conditions, and $\Delta_{TD}$ represents a desired time period value. As described hereinabove with reference to FIG. 4B, desired time period $\Delta TD$ is indicative of an "in-phase" relationship between rotor position and a conduction interval for the motor phase 18 in which time period $\Delta_{T(A)}$ is being measured.

Referring to FIG. 5D, substep 80 may further include the substep 88 of calculating an advance time $\Delta_{AT}$. As shown in FIG. 7A, advance time $\Delta_{AT}$ represents the time period between the initiation of sensing interval 69 and conduction interval 84. Advance time $\Delta_{AT}$ may be obtained using the following formula:

$$\Delta_{AT}=P'/n$$

wherein n is an integer value that varies depending upon the speed of operation and other characteristics of motor 10. In particular, the value n may be varied to control the initiation of conduction interval 84 relative to the level of inductance in phase coil 32. In one constructed embodiment, n may equal 2 at relatively low speeds and increase as the speed of motor 10 increases.

Referring to FIG. 5D, substep 80 may finally include the substep 90 of supplying current to coil 32 at a time $T_{I(A)}$ corresponding to advance time $\Delta_{AT}$. Referring to FIGS. 7A and 7B, at time $T_{I(A)}$, microcontroller 52 causes phase control signal $V_{C(A)}$ to transition to a high logic level to control switches 40, 42 and supply current to coil 32.

Figure 5E:
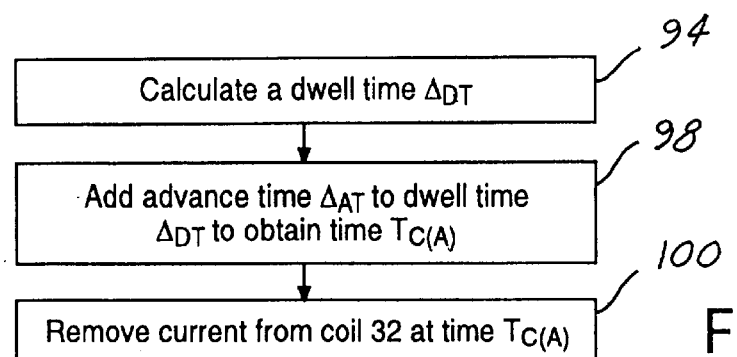

Referring again to FIG. 5C, the step of controlling a conduction interval 84 in phase coil 32 may further include the substep 92 of commutating conduction interval 84 in coil 32 responsive to the determined characteristic of current in coil 32. Referring to FIG. 5E, in one constructed embodiment wherein the current characteristic represents a time $\Delta_{T(A)}$ for current to rise between predetermined lower and upper current levels, substep 92 may include the substep 94 of calculating a dwell time $\Delta_{DT}$. As shown in FIG. 7A, dwell time $\Delta_{DT}$ represents the period of conduction interval 84. Dwell time $\Delta_{DT}$ may be obtained using the following formula:

$$\Delta_{DT}=P'+/-P'/k$$

where k is an integer value chosen to correspond to a value of between about 120 and about 160 electrical degrees. During nonbraking operation of motor 10, the dwell times, or periods of conduction, for conduction intervals 84, 86, and conduction interval 96 in phase coil 36 (see FIG. 7E), are preferably about equal. During braking, however, the conduction intervals 84, 86, and 96 occur substantially during a period of falling inductance and dwell time $\Delta_{DT}$ or the period of conduction interval 84, may be less than the dwell times or periods of conduction intervals 86, 96 to allow the introduction of the sensing current pulse during sensing interval 69.

Referring again to FIG. 5E, substep 92 may further include the substep 98 of calculating a commutation time TC(A) according to the following formula:

$$T_{C(A)}=\Delta_{AT}+\Delta_{DT}$$

Substep 92 may finally include the substep 100 of removing the supply of current from coil 32 at time $T_{C(A)}$. Referring to FIGS. 7A and 7B, at time $T_{C(A)}$, microcontroller 52 causes phase control signal $V_{C(A)}$ to transition to a low logic level to control switches 40, 42 and remove the supply of current from coil 32.

Figure 5F:
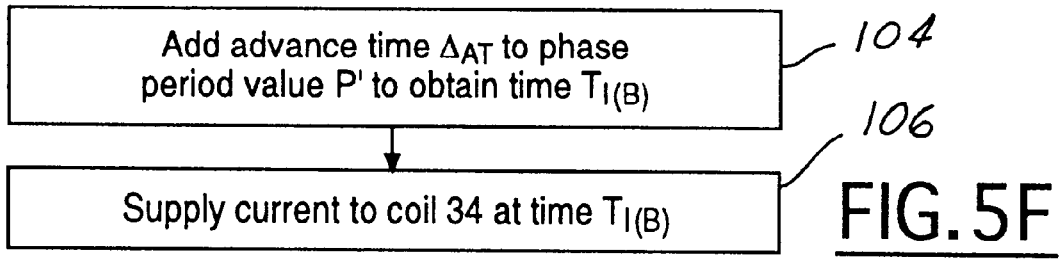

Referring again to FIG. 5C, the step of controlling a conduction interval 86 in phase coil 34 may include the substep 102 of initiating conduction interval 86 in coil 34 responsive to the determined characteristic of current in coil 32. Referring to FIG. 5F, in one constructed embodiment wherein the current characteristic represents a time $\Delta_{T(A)}$ for current to rise between predetermined lower and upper current levels in coil 32, substep 102 may include the substep 104 of calculating an initiation time $T_{I(B)}$ according to the following formula:

$$T_{I(B)}=\Delta_{AT}+P'$$

Figure 7D:
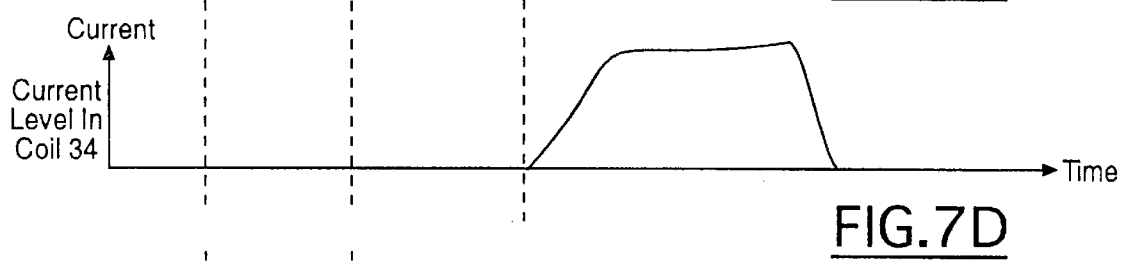

Substep 102 may finally include the substep 106 of supplying current to coil 34 at time $T_{I(B)}$. Referring to FIGS. 7C and 7D, at time $T_{I(B)}$, microcontroller 52 cause phase control signal $V_{C(B)}$ to transition to a high logic level to control switches disposed on either side of phase coil 34 and supply a current to coil 34.

Figure 5G:
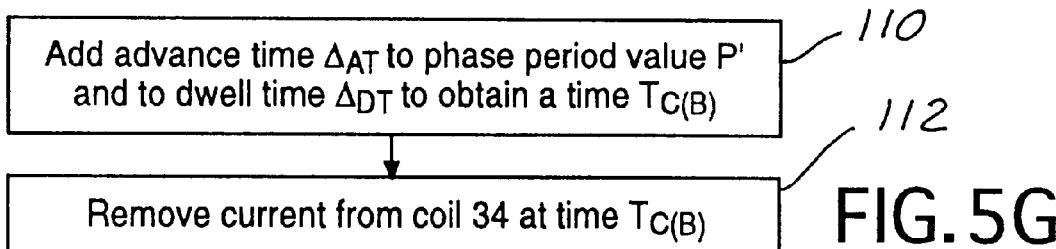

Referring again to FIG. 5C, the step of controlling a conduction interval 86 in phase coil 34 may include the substep 108 of commutating conduction interval 86 in coil 34 responsive to the determined characteristic of current in coil 32. Referring to FIG. 5G, in one constructed embodiment wherein the current characteristic represents a time $\Delta_{T(A)}$ for current to rise between predetermined lower and upper current levels in coil 32, substep 108 may include the substeps 110 of calculating a commutation time $T_{C(B)}$ according to the following formula:

$$T_{C(B)}=\Delta_{AT}+\Delta_{DT}+P'$$

Substep 108 may finally include the substep 112 of removing the supply of current from coil 34 at time $T_{C(B)}$. Referring to FIGS. 7C and 7D, at time $T_{C(B)}$, microcontroller 52 cause phase control signal $V_{C(B)}$ to transition to a low logic level to control switches disposed on either side of phase coil 34 and remove the supply of current from coil 34.

Figure 5H:
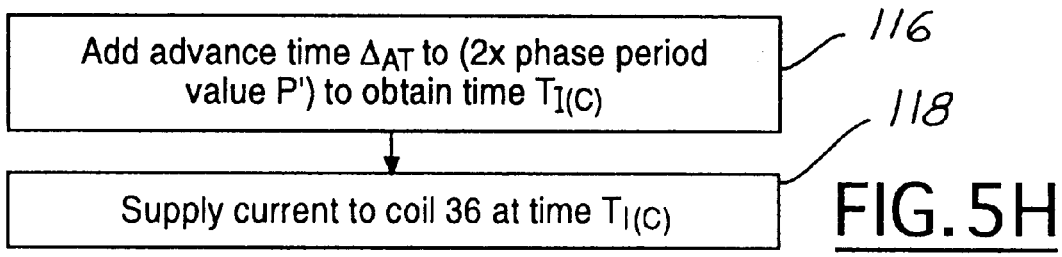

Referring again to FIG. 5C, the step of controlling a conduction interval 88 in phase coil 36 may include the substep 114 of initiating conduction interval 88 in coil 36 responsive to the determined characteristic of current in coil 32. Referring to FIG. 5H, in one constructed embodiment wherein the current characteristic represents a time $\Delta_{T(A)}$ for current to rise between predetermined lower and upper current levels in coil 32, substep 114 may include the substep 116 of calculating an initiation time $T_{I(C)}$ according to following formula:

$$T_{I(C)} = \Delta_{AT} + 2P'$$

Figure 7E:
Figure 7F:
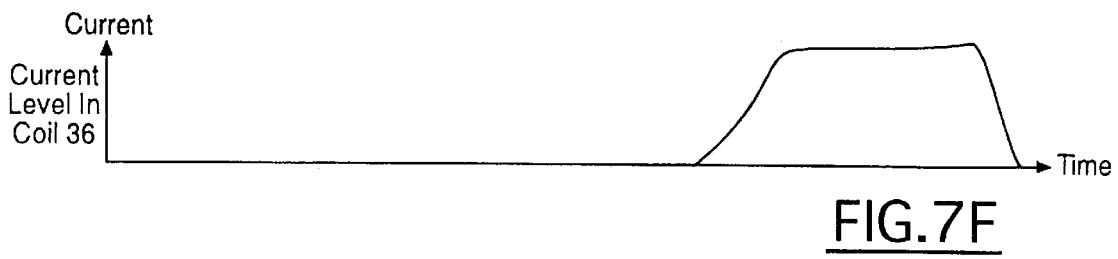

Substep 114 may further include the substep 118 of supplying current to coil 38 at time $T_{I(C)}$. Referring to FIGS. 7E and 7F, at time $T_{I(C)}$, microcontroller 52 cause phase control signal $V_{C(C)}$ to transition to a high logic level to control switches disposed on either side of phase coil 36 and supply a current to coil 36.

Figure 5I:
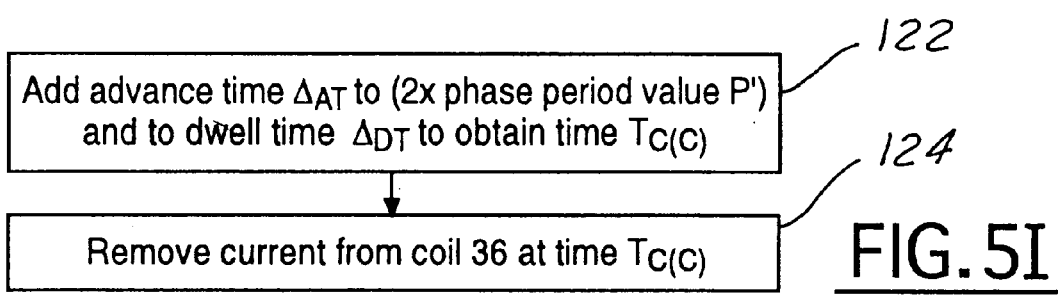

Referring again to FIG. 5C, the step of controlling a conduction interval 88 in phase coil 38 may include the substep 120 of commutating conduction interval 88 in coil 36 responsive to the determined characteristic of current in coil 32. Referring to FIG. 5I, in one constructed embodiment wherein the current characteristic represents a time $\Delta_{T(A)}$ for current to rise between predetermined lower and upper current levels in coil 32, substep 120 may include the substep 122 of calculating a commutation time TC(c) according to the following formula:

$$T_{C(C)} = \Delta_{AT} + \Delta_{DT} + 2P'$$

Substep 120 may finally include the substep 124 of removing the supply of current from coil 36 at time $T_{C(C)}$. Referring to FIGS. 7E and 7F, at time $T_{C(C)}$, microcontroller 52 cause phase control signal $V_{C(C)}$ to transition to a low logic level to control switches disposed on either side of phase coil 36 and remove the supply of current from coil 36.

Referring again to FIG. 5A, a method in accordance with the present invention may also include the step of repeating steps 68, 70, and 78 (and their associated substeps) a plurality of times.

A method and circuit in accordance with the present invention represents a significant improvement over conventional motor control methods and circuits. In particular, the inventive method and circuit may be used to control currents in multiple phase coils by determining a current characteristic of one phase coil. The inventive method and circuit thus offers several advantages over conventional motor control methods and circuits. First, the inventive method and circuit require fewer microprocessor resources than conventional motor control methods and circuits. Second, by reducing the number of current sensing pulses, the inventive method and circuit result in increased motor efficiency. During normal running, the efficiency and maximum speed of the motor are increased because the number of current sensing pulses during the falling inductance regions of the motor phases are reduced. During braking, a greater braking torque may be generated because the conduction intervals in the respective phase coils can be made longer in the absence of multiple current sensing pulses. Finally, the inventive method and circuit generate less acoustic noise as compared to conventional circuits and methods because of the reduction in current sensing pulses.

While the invention has been particularly shown and described with reference to the preferred embodiments thereof, it is well understood by those skilled in the art that various changes and modifications can be made in the invention without departing from the spirit and scope of the invention.

We claim:

1. A method for controlling a motor, including the steps of:

providing a first current to a first phase coil of said motor;
determining a characteristic of said first current in said first phase coil wherein said characteristic is indicative of a position of a rotor of said motor;
controlling said first current in said first phase coil of said motor and a second current in a second phase coil of said motor responsive to said characteristic.

2. The method of claim 1 wherein said characteristic comprises a time period for said first current to move between first and second predetermined current levels.

3. The method of claim 1 wherein said determining step includes the substeps of:

sensing a level of said first current in said first phase coil;
comparing said level of said first current to first and second predetermined current levels and generating first and second comparison signals responsive thereto; and,
generating a characteristic indicative signal indicative of said characteristic responsive to said first and second comparison signals.

4. The method of claim 1, further comprising the step of controlling a third current in a third phase coil of said motor responsive to said characteristic.

5. The method of claim 1 wherein said controlling step includes the substep of controlling a first conduction interval in said first phase coil responsive to said characteristic.

6. The method of claim 5 wherein said controlling step further includes the substep of controlling a second conduction interval in said second phase coil responsive to said characteristic.

7. The method of claim 6 wherein a duration of said first conduction interval is less than a duration of said second conduction interval.

8. A method for controlling a motor, including the steps of:

providing a first current to a first phase coil of said motor;
determining a characteristic of said first current in said first phase coil wherein said characteristic is indicative of a position of a rotor of said motor;
initiating a first conduction interval in said first phase coil responsive to said characteristic;
commutating said first conduction interval in said first phase coil responsive to said characteristic;
initiating a second conduction interval in a second phase coil responsive to said characteristic; and,
commutating said second conduction interval in said second phase coil responsive to said characteristic.

9. The method of claim 8 wherein said characteristic comprises a time period for said first current to move between first and second predetermined current levels.

10. The method of claim 8 wherein said determining step includes the substeps of:

sensing a level of said first current in said first phase coil;
comparing said level of said first current to first and second predetermined current levels and generating first and second comparison signals responsive thereto; and,
generating a characteristic indicative signal indicative of said characteristic responsive to said first and second comparison signals.

11. The method of claim 8, further comprising the step of controlling a third conduction interval in a third phase coil of said motor responsive to said characteristic.

12. The method of claim 8 wherein said step of initiating a first conduction interval includes the substep of calculating an advance time responsive to said characteristic, said advance time comprising a time period between initiation of a sensing interval in said first phase coil and initiation of said first conduction interval.

13. The method of claim 8 wherein a duration of said first conduction interval is less than a duration of said second conduction interval.

14. A circuit for controlling a motor, comprising:

means for providing a first current to a first phase coil of said motor;

means for determining a characteristic of said first current in said first phase coil wherein said characteristic is indicative of a position of a rotor of said motor; and, a microcontroller that controls said first current in said first phase coil of said motor and a second current in a second phase coil of said motor responsive to said characteristic.

15. The circuit of claim 14 wherein said characteristic comprises a time period for said first current to move between first and second predetermined current levels.

16. The circuit of claim 14 wherein said determining means comprises:

a current sensor that generates a current indicative signal indicative of a level of said first current;

a first comparator that generates a first comparison signal responsive to said current indicative signal and a lower current level signal indicative of a first predetermined current level;

a second comparator that generates a second comparison signal responsive to said current indicative signal and an upper current level signal indicative of a second predetermined current level; and, a logic circuit that generates a characteristic indicative signal responsive to said first and second comparison signals.

17. The circuit of claim 14 wherein said microcontroller includes means for controlling a first conduction interval in said first phase coil and a second conduction interval in said second phase coil responsive to said characteristic.

18. The circuit of claim 17 wherein said means for controlling said first and second conduction intervals includes means for initiating and commutating each of said first and second conduction intervals responsive to said characteristic.

19. The circuit of claim 17 wherein a duration of said first conduction interval is less than a duration of said second conduction interval.

20. The circuit of claim 14, wherein said microcontroller controls a third current in a third phase coil of said motor responsive to said characteristic.

* * * * *